United States Patent
Yang et al.

(10) Patent No.: US 6,803,446 B2
(45) Date of Patent: Oct. 12, 2004

(54) FUNCTIONALIZED AND PROCESSABLE CONDUCTING POLYMERS

(75) Inventors: Sze Cheng Yang, Wakefield, RI (US); Wenguang Li, Los Alamos, NM (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 09/905,316

(22) Filed: Jul. 13, 2001

(65) Prior Publication Data

US 2002/0037994 A1 Mar. 28, 2002

Related U.S. Application Data

(60) Provisional application No. 60/218,089, filed on Jul. 13, 2000.

(51) Int. Cl.[7] .......................... C08G 73/00; C08G 73/06

(52) U.S. Cl. ...................... 528/423; 528/373; 525/191; 525/202; 525/242; 429/212; 429/213

(58) Field of Search ................................. 528/422, 373; 525/191, 202, 242; 429/212, 213

(56) References Cited

U.S. PATENT DOCUMENTS

| | | |
|---|---|---|
| 5,069,820 A | 12/1991 | Jen et al. |
| 5,160,457 A | 11/1992 | Elsenbaumer |
| 5,232,631 A | 8/1993 | Cao et al. |
| 5,441,772 A | 8/1995 | McAndew et al. |
| 5,489,400 A | 2/1996 | Liu et al. |
| 5,532,025 A | 7/1996 | Kinlen et al. |
| 5,543,084 A | 8/1996 | Kinlen et al. |
| 5,556,518 A | 9/1996 | Kinlen et al. |
| 5,567,356 A | 10/1996 | Kinlen |
| 5,721,056 A | 2/1998 | Wessling |
| 5,824,371 A | 10/1998 | Epstein et al. |

FOREIGN PATENT DOCUMENTS

| WO | WO 95/00678 | 1/1995 |
|---|---|---|
| WO | WO 9703127 | * 1/1997 |

* cited by examiner

*Primary Examiner*—Duc Truong
(74) *Attorney, Agent, or Firm*—Gauthier & Connors, LLP

(57) ABSTRACT

A electrically conductive polymeric composition comprising a plurality of polymeric complexes. Each polymeric complex comprises a strand of a π-conjugated polymer and strand of a polyelectrolyte. The polyelectrolyte is non-covalently bond to the π-conjugated polymer and has at least one reactive functional group that facilitates cross-linkage between the polymeric complexes when the polymeric complexes are heated.

7 Claims, 3 Drawing Sheets

FUNCTIONALIZED AND PROCESSABLE CONDUCTING POLYMERS

CROSS-REFERENCE TO RELATED APPLICATIONS

This application claims the benefit of U.S. Provisional Application No. 60/218,089, filed on Jul. 13, 2000.

BACKGROUND OF THE INVENTION

1. Field of the Invention

This invention relates to electrically conductive molecular complexes.

2. Background of the Invention

Conductive polymers ($\pi$-conjugated polymers) are potentially useful as a polymeric coating materials to impart special electrical, optical and electroactive properties to coated surfaces. When used to coat on metals it can impart protection against corrosion of the metals. See DE4334628 and U.S. Pat. No. 5,532,025. The electrically conductive form of the conducting polymers can also be coated on non-conductive surfaces to render the surface film to be electrically conductive. Examples of the $\pi$-conjugated polymers are polyaniline, polypyrrole, polyacetylene, polythiophene, etc.

The $\pi$-conjugated polymers are electrically conductive when it is doped by ionic compounds. In the electrically conductive state, the $\pi$-conjugated polymer backbone is a polycation. The positive charge on the ic-conjugated polymer backbone is the mobile charge that leads to electrical conductivity. The dopants are the counter ions that balance the positive charges. The difficulties in using conventional conducting polymers for coatings are associated with two of their properties; (1) they are unstable in their doped state and (2) they lack processability. The reason for the lack of processability comes from the fact that the conducting polymers are $\pi$-conjugated polymers. The delocalized $\pi$ electronic structure leads to a stiff polymer chain and strong inter-chain attraction. Thus, the conventional conducting polymers cannot be easily dissolved, melted or blended with other polymers.

The lack of material stability comes from the fact that the ionic dopants are easily lost or segregated from the conventional $\pi$-conjugated polymers. Examples of the dopants that have been used include hydrogen chloride, p-toluene sulfonic acid, 4-dodecylbenzene sulfonic acid, and dinonyl-naphthalenedisulphonic acid (Jen et al., U.S. Pat. No. 5,069,820, Dec. 3, 1991; Elsenbaumer, U.S. Pat. No. 5,160,457, Nov. 3, 1992; Cao et al., U.S. Pat. No. 5,232,631, 1993; Kinlen U.S. Pat. No. 5,567,356, Oct. 22, 1996). When these conducting polymers are exposed to heat, water, solvents and/or moisture, these molecular dopants are lost. Once the dopants are lost, the polymer loses its electrical conductivity and its electroactivity. The loss of dopants occurs either during the manufacturing process or during the service life of the coated product. In certain cases, molecular anions with bulky organic groups were used to reduce the rate of loss of the dopant.

This only slows down the rate of dopant loss, it does not eliminate the problem. Even when the dopant is not lost from the coating, the electrical conductivity can be lost due to the diffusion of dopants at a microscopic length scale. The detachment of the dopants from the ic-conjugated polymer backbone at a microscopic length scale (0.1 pm length) leads to dedoping. A microscopic scale phase segregation between the polymer and the dopants are easily promoted by heat or solvent. The molecular dopants tend to segregate from the vicinity of the polymeric chain of the ic-conjugated polymer backbone which results in a loss of the desirable properties.

A problem with the conventional $\pi$-conjugated polymers is that they are brittle, hard and solid. In coating applications, the conventional $\pi$-conjugated polymers do not adhere to the surface of the substrate. Thus the $\pi$-conjugated polymers are blended with an insulating, non-conductive resin so that the mixture could be adherent to the surface of a substrate. See U.S. Pat. Nos. 5,532,025, 5,543,084 and 5,556,518. When the conducting polymer is imbedded in a matrix of a non-conducting polymer such as epoxy resin, polyurethane, polyacrylate or alkyd binders, the rate of dopant loss is reduced in the macroscopic level (e.g. 0.1 mm length), but the problem of segregation at a microscopic length scale (e.g. 0.1~tm length) is not eliminated. The electroactive properties will show signs of degradation over a period of several months. For a number of applications, the material stability is not good enough. In addition to the problem with the service life of coatings or blends of these $\pi$-conjugated polymers, there are problems with the manufacturing process. The dopants are easily lost during the manufacturing process either because of heat or because of contact with water or polar solvents. For example, U.S. Pat. No. 5543084 disclosed a method for electrocoating a blend of epoxy and polyaniline. The conductive polymer PANI-PTSA (polyaniline doped by p-toluenesulfonic acid) was mechanically blended in aqueous solution and then electrophoretically coated on metal. From the disclosure it is evident that the anionic dopant of PANI-PTSA was lost before the $\pi$-conjugated polymer was co-deposited with epoxy. A redoping by immersing the coating in camphor sulfonic acid was needed to restore polyaniline to its electrically conductive state. It is expected that the dopants incorporated by redoping will be easily dedoped again by either heat or by exposure to moisture.

Coatings that use undoped polyaniline (emeraldine base) have been disclosed in the literature (McAndrew et al. U.S. Pat. No. 5,441,772, and Epstein et al. U.S. Pat. No. 5,824,371). These $\pi$-conjugated polymers without dopant are nonconductive because there is no charge carrier on the polymer backbone. These non-conducting polymer coatings do not have the comparable performance as a coating material. For most applications it is essential to maintain the $\pi$-conjugated polymers in the electrically conductive state. Thus it is desirable to have an electrically conductive polymer that is both processable and is stable against the loss of dopants.

An alternative to the above mentioned remedies is to synthesize a molecular complex of the $\pi$-conjugated polymer and a polymeric dopant. If the polymeric dopant is strongly bonded to the $\pi$-conjugated polymer the dopant will not be easily lost during the manufacturing process and the service life of the conducting polymer. A method was previously disclosed for synthesizing processable conducting polymers with stable dopants (Liu et al. U.S. Pat. No. 5,489,400). In this disclosure, a template-guided chemical polymerization was used to obtain a polymeric complex that contained a strand of polyaniline and a strand of a polyelectrolyte. The reaction product is a non-covalently bonded molecular complex between a conducting polymer and a polyelectrolyte. The molecular complex contains the two linear chains of the component polymers bonded in a side-by-side fashion. The complex is a double-strand synthetic polymer. When polyaniline is the conductive strand, dsPAN designates the double-strand polyaniline. Compared with the double-strand biopolymer, DNA, the synthetic dsPAN is less ordered in structure and is generally not in a helical conformation. Examples of the polyelectrolytes are poly(styrenesulfonic acid) and poly(acrylic acid). Since the two strands of polymers are bonded strongly, these polymeric complexes are stable and do not dedope easily.

The dsPAN disclosed in this '400 patent is one of three types. The first type is a water-soluble polymeric complex of polyaniline. This type of dsPAN is not suitable for anticorrosion coating applications because a pure dsPAN coating is redissolved in contact with water therefore the coating is lost in rain or humid air. It is conceivable that the water-soluble dsPAN be incorporated in a polymeric binder that prevents water dissolution of the coating. The hydrophilicity of this type of dsPAN is, however, still a problem for corrosion protection. The coating will absorb moister or swell in water thus reduce the adhesion of binder to the metal substrate.

A second type of dsPAN disclosed was an insoluble solid that precipitates from the aqueous reaction medium. This type of dsPAN can only be mixed with the binder by vigorous mechanical mixing (in a manner similar to that used for blending single-strand PANI-PTSA with epoxy described in Example 13 of Kinlen et al. U.S. Pat. No. 5,543,084). Although a blend made in this manner overcomes the problem of dedoping in U.S. Pat. No. 5,543,084, it is still not ideal. The dispersion contains large and brittle particles. The particles are not small enough for optimal polymer-metal interaction even when the precipitated particles are ground with a ball mill. The large particles do not 'wet' the metal surface. Another problem is that the mechanically stirred suspension is not a stable dispersion. It is difficult to maintain a uniform and stable suspension for large scale industrial production.

The third type of dsPAN disclosed in the '400 patent is a colloidal suspension of small particles. Although the particle size is suitable for the electroactive polymer to interact with the metal surface to impart protection of the metal, the concentration of the colloidal particles in water is quite low (less than 1 g m of colloidal particles per liter of water). This low concentration is incompatible to the preferred high-solid content coating formulation.

PCT Publication WO 97/03127 discloses a chemically modified dsPAN that is soluble in polar organic solvents and can be applied to metal surfaces as a paint. The coating disclosed protecting metals from corrosion. These organic soluble dsPANs overcame the water absorption (swelling) problem of the water-soluble dsPAN disclosed in Liu et al. U.S. Pat. No. 5,489,400. This type of dsPAN is suitable for use as either a solvent-based paint or as a blend with hydrophobic epoxy oligomer for a thermoset coating. This type of dsPAN does not swell in water so it is suitable to be used as a coating. Although the coating is suitable for certain applications, a thin film of this material lacks mechanical strength.

BRIEF SUMMARY OF THE INVENTION

The composition of the invention contains double strand conducting polymer (e.g., double-strand polyaniline and double-strand polypyrrole) with chemical functional groups in the second strand (the polymeric dopant) of the polymeric complex. The functional groups provide sites for chemical reactions after the coating or thin film formation step. One example of using the composition is to form a mechanically stronger film by a two-step process. In the first step of the process, the conductive polymer composition is either coated on a substrate or extruded to form a sheet or a fiber. In the second step of the process, the chemical reaction of the functionalized polymers is initiated to cause cross-linking. The cross-linked film or fiber has improved mechanical strength because in addition to the weaker van der Waals force for physical aggregation, there are covalent chemical bonds to maintain the integrity of the film or the fiber. The material is thus an improvement over the material disclosed in PCT Publication WO 97/03127 because the cross-linking provides mechanical strength to the material. For freestanding films or fibers, the mechanical strength of the cross-linked conducting polymer is better than the prior art materials.

The present invention maintains the advantage of a water-borne coating or film forming process, and at the same time avoids the swelling problem by allowing a cross-linking process following the water-borne coating process. In addition to the advantage of eliminating swelling, the cross-linked conducting polymer provides additional advantages. Compared to the non-cross-linked polymers, the cross-linked polymer forms coating with better hardness while retaining toughness. The coating also provide good adhesion to substrates.

The advantageous functionalization is easily obtained with the double-strand functionalized conducting polymer. It is difficult to achieve the same advantage in single-strand conducting polymer. The functional groups of the present invention resides in the second strand of the polymeric complex. The advantage is that there are a large number of possibilities of attaching functional groups on the second strand without impeding the electronic, optical and the electroactive properties of the first strand (the conducting polymer). In a single-strand conducting polymer with small dopants, the functional groups need to be attached to the conducting polymer. It is known in the literature that the additional functional groups degrade the electronic, optical and electroactive properties of the conducting polymer.

The present invention comprises a composition that retains the advantageously water-borne property to those disclosed in the publications, "Conducting Polymers for Coatings and Antielectrostatic Applications" Sze C. Yang, Huaibing Liu, Robert Clark, U.S. Patent filed Oct. 29, 1997, PCT/U.S. 98/23032, filed Oct. 29, 1998 and "Water-borne Anticorrosive Coating Composition Comprising a Polymeric Complex of Polyaniline and Polymeric Ions" Sze C. Yang and Richard Brown, PCT/US 99/28307, filed Dec. 1, 1999), but at the same time avoids the problem of water or solvent induced swelling that the compositions disclosed in the publications exhibit. In addition, the new composition enhances mechanical strength (cohesive strength) and adhesion to substrate (adhesive strength).

Broadly, the invention comprises a family of two-component polymeric complexes of π-conjugated polymers that are suitable for water-borne coating applications. One of the component (the first strand) contributes to the electronic, optical and electroactive properties. The other component (the second strand) contributes to the functionalizations that are advantageous for various applications. The invention also embodies the process of making the polymeric complexes, the use of the polymeric complexes in (1) anti-corrosion, (2) anti-electrostatic, (3) electrochromic formulations, a family of coating compositions containing the polymeric complexes, the method of applying the coating composition on a surface and the coating compositions per se.

More particularly, the present invention comprises a water-borne coating composition comprising a polymeric complex between a π-conjugated polymer, a polymeric ion (that serves as a dopant for the π-conjugated polymer), and a non-conductive polymer with functional groups. The functional groups allow for reactions that improve the properties of the coating.

More particularly, the invention comprises a coating that is a water-borne coating that can be cross-linked by reactions of the functional groups of the second strand and one or more components in the composition.

DESCRIPTION OF THE PREFERRED EMBODIMENT

Figure 1A:
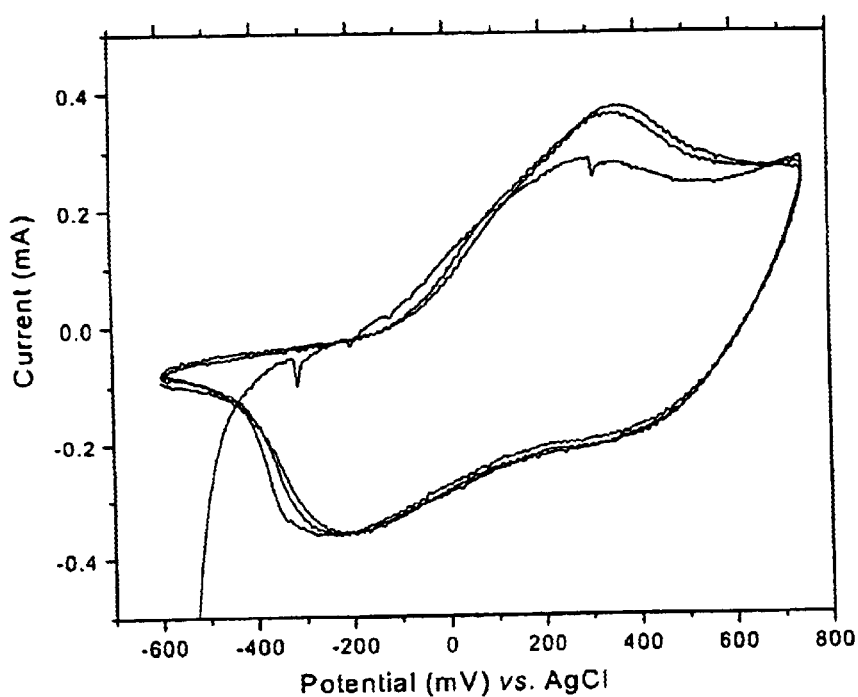
FIGS. 1a–1d are cyclic votammograms.
Figure 1B:
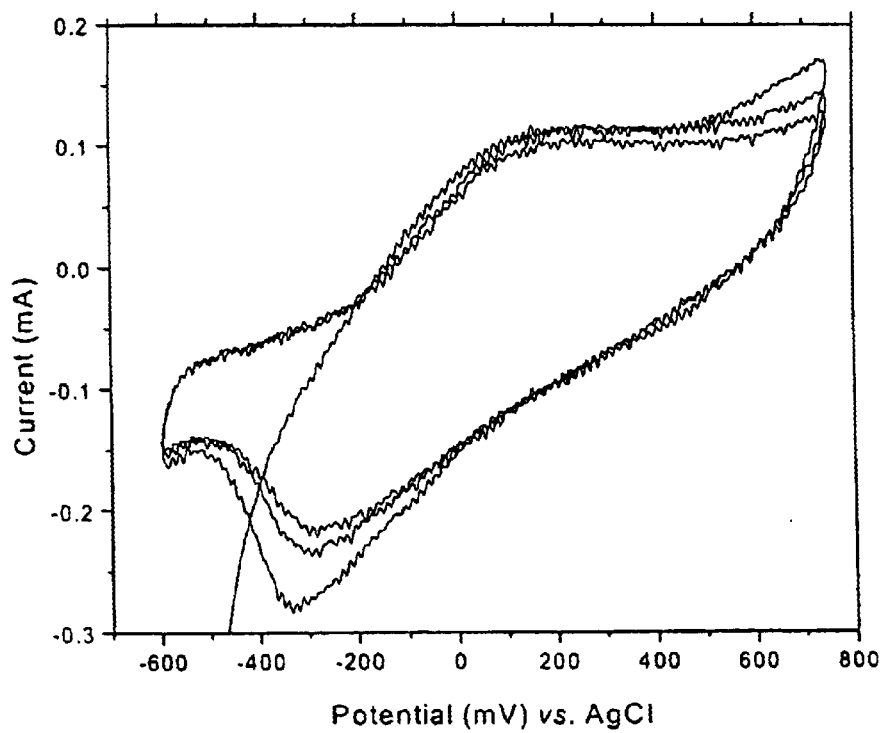
Figure 1C:
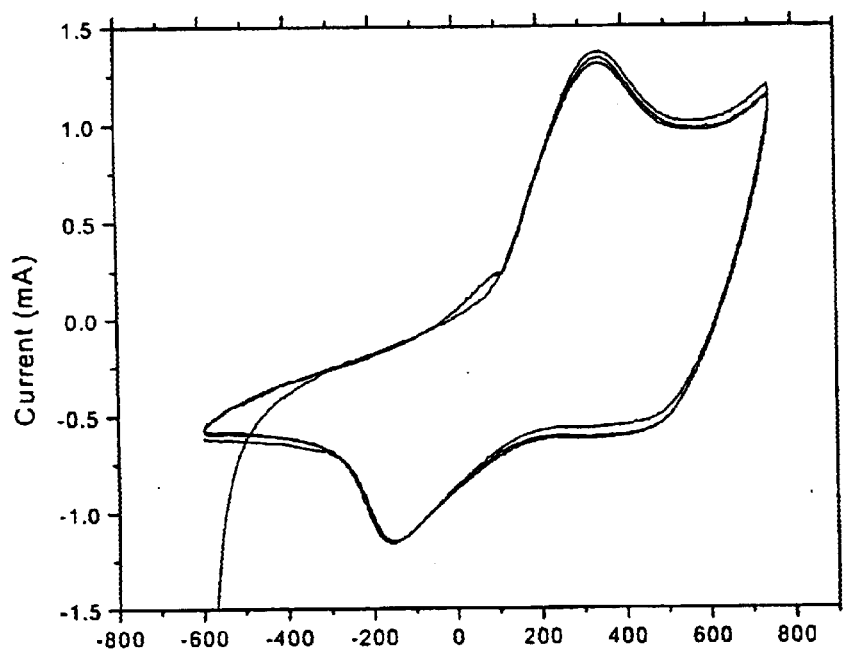
Figure 1D:
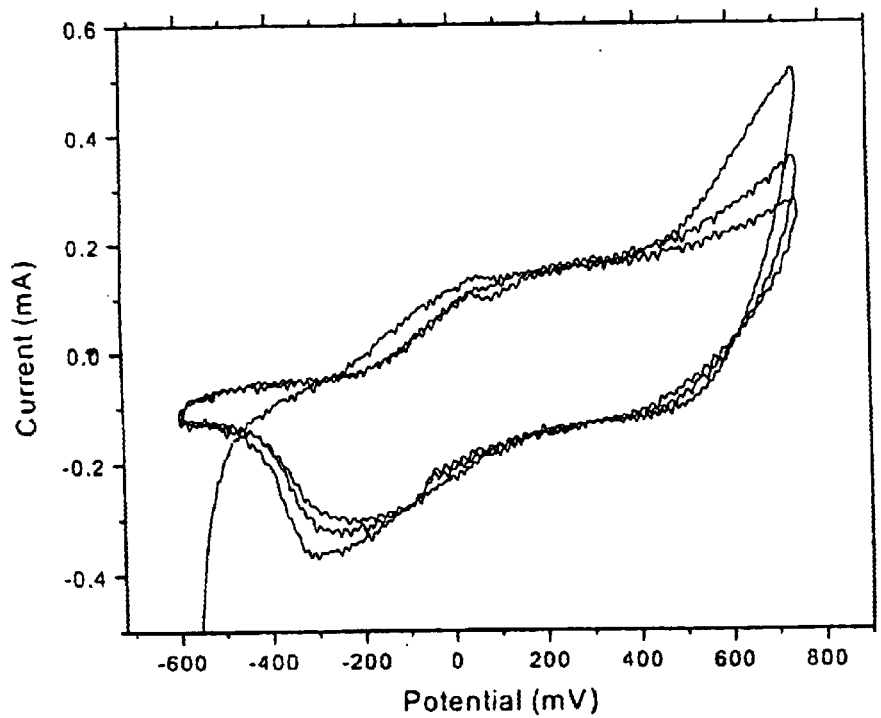

The functionalized polymeric complex composition is either water-borne or dispersible in organic solvents. The two-component polymeric complex contains two strands of polymers. One strand is a π-conjugated polymer that imparts electroactive and conductive properties to the coating so that it is effective for protecting metals from corrosion by its interaction with the metal surface. Another strand is a polymeric ion that is noncovalently bonded to the π-conjugated polymer at a multiplicity of sites either due to electrostatic attraction, hydrogen bonding or van der Waals force. The strong bonding between the two components of the polymeric complex provides the needed stability against the loss of ionic dopants. The improved dopant stability in the double-strand polymer overcomes the deficiencies of the single-strand conducting polymers in the prior art.

The double-strand polymeric complex contains reactive functional groups in the polymeric dopant. The reactive functional group can be a functionality of the polymer backbone or a pendent group, or a side-chain of the polymeric dopant. An unsaturated double bond in poly (butadiene-co-maleic acid) is an example of the reactive functional group on the polymer backbone. A reactive carboxylic acid group attached to a vinyl polymer backbone is an example of reactive pendent group.

Other examples of reactive pendent groups include unsaturated double bond, carboxylic acid groups, —OH groups, amine groups, amide groups, nitrile groups, aldehyde groups, ketone groups, etc. These functional groups may either react with other functional groups of a near-by polymeric complex or react with another component of the functionalized composition.

An example of the double-stranded polymeric complex is the double-strand conducting polymer which has polyaniline or polypyrrole as the π-conjugated component in the complex, and a polymeric anion as the second strand. Examples of the polymeric anions are poly(butadiene-co-maleic acid), poly(vinylmethylether-co-maleic acid), poly (acrylic acid), poly(ethylmethacrylate-co-acrylic acid), poly (acrylamide-co-acrylic acid), and other anionic polymers. In addition to the anionic polymers, polymers containing both the anionic and the cationic functional groups such as a protonable amine and a tertiary amine can be used. The ionic functional groups in the second strand serve at least two functions: (1) the anionic groups are the counter ions to the positive charge carriers on the π-conjugated polymer, and (2) both the anions and the cations on the polymer help disperse the conducting polymer complex in water so that it can be used as a water-borne coating material, or dispersed in suitable organic solvents. The reactive functional groups allow chemical reaction among the components of the mixture.

Synthesis of Cross-linkable Complexes of Conductive Polymers

Inter-polymer complexes of polyaniline and poly (butadiene-co-maleic acid), (PAN:PBMA)(1) and polypyrrole and poly(butadiene-co-maleic acid))(PPy:PBMA)(2) that were synthesized according to the invention are illustrated by the following structures:

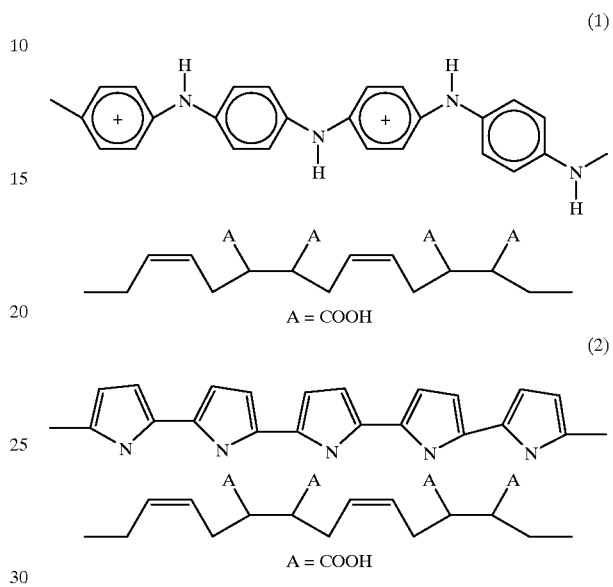

The invention will be described with reference to the following non-limiting examples.

EXAMPLE 1

PBMA and monomer (aniline or pyrrole) were dissolved in 30% aqueous solution of acetic acid. The concentration of monomer is around 2%. The ratio of carboxylic groups to monomer is 1:0.9. Concentrated $H_2SO_4$ was added to the solution of aniline to adjust pH value to 1. It is not necessary to add extra $H_2SO_4$ to pyrrole solution. The solution was stirred at least 2 hours. Sodium persulfate solution was dropped into the solution of monomer slowly. The synthesis was carried out at room temperature, 0° C., or –13° C. The mole ratio of aniline (or pyrrole) to sodium persulfate is 1:1. After the addition of the oxidant, keep stirring the solution for 4 hours.

Synthesis of PANI-PBMA complex is described as follows: dissolve 5 g 40% PBMA in 70 ml 30% acetic acid, add 1.97 g aniline into the solution, stir the solution for 2 hours and add 98% $H_2SO_4$ to adjust pH value of the solution to 1. The solution is cooled down to –13° C. 5 $NaS_2O_8$ dissolved in 30 ml 30% acetic acid is added to the solution dropwise. Keep stirring the solution for 4 hours while it is stirred at –13° C.

Synthesis of PPy-PBMA complex is described as follows: dissolve 5 g 40% PBMA in 70 ml 30% acetic acid, add 1.42 g pyrrole into the solution, stir the solution for 1 hour and cool it down to 0° C. 5 $NaS_2O_8$ dissolved in 30 ml 30% acetic acid is added to the solution dropwise. Keep stirring the solution for 4 hours while it is stirred at 0° C.

A colloidal product was obtained. The small amount of precipitate was removed by filtration with filter paper. PBMA-PANI is a green transparent colloidal solution. PBMA-PPy is a dark brown suspension. To remove the small molecules and ions, the product was put in a membrane bag and dialyzed against 30% acetic acid for one week. The products can be dispersed into methanol, ethanol, DMF or THF by dialysis against these solvents.

Yield is measured by weighing the dried products. The yield of both polyaniline and polypyrrole is higher than 80%, if we assume that PBMA is 100% recovered in the product.

A conducting polymer film is cast from the colloidal suspension. Cross-linked complexes are obtained by heating the film at 140° C. to 180° C. for 1 hour. The possible mechanism of cross-link is the esterification of double bonds by carboxylic acid. Cross-linked films can resist swelling in water. Conductivity of the cross-linked free-standing films is about 1 S/cm.

EXAMPLE 2

Polyacrylic acid (MW. 250,000, 450,000, 750,000, and 1,250,000) is dissolved in water (1–5%). Aniline is added to the solution. The molar ratio of carboxylic acid to aniline is 1:0.5 to 1:1.5. (for MW. 750,000 and 1,250,000 the highest loading is 1:0.8). 98% sulfuric acid is added to adjust pH of the solution to be 1. The solution is then stirred vigorously by mechanical stirrer and cooled in ice to 0° C. Ammonium persulfate is dissolved in water, and is added to the solution of polyacrylic acid and aniline while it is stirred vigorously. Keep stirring for 4 hours at 0° C. The resulting product is dialysized in water for 7 days. The products can also be dispersed in ethanol, methanol, and THF by dialysis against these solvents. Films can be cast from the product. The conductivity of the films is about $10^{-2}$ S/cm. The films swell in water and lose the mechanical strength.

A typical example of synthesis of polyacrylic acid complexes is described as follows: 1 g polyacrylic acid (MW. 250,000) is dissolved in 60 ml water (1–5%). 1 g Aniline is added to the solution. 98% sulfuric acid is added to adjust pH of the solution to be 1. The solution is then stirred mechanically vigorously and cooled in ice to 0° C. 2.45 g ammonium persulfate is dissolved in 40 ml water, and is added to the solution of polyacrylic acid and aniline while it is stirred vigorously. Keep stirring for 4 hours at 0° C. The resulting product is dialysized in water for 7 days.

EXAMPLE 3

Multihydroxyl compounds, such as glycol, glycerol, butadiol, hexdiol, octadiol, or polyvinyl alcohol are added in product of poly(carboxylic acid) complexes. The ratio of the cross-linker to complexes can be 1:0.1 to 1:1. The complexes can be polyacrylic acid, poly(vinyl methyl ether-alt-maleic acid), and poly(butadiene-alt-maleic acid) complexes with polyaniline and polypyrrole. The solution is cast on glass dried in air at room temperature. The films are heated at 140–150° C. for 1 hour. The cross-linked films can resist swelling in water. The conductivity is between $10^{-3}$ to $10^5$ S/cm. From FTIR, the esterification of carboxylic acid by alcohol is responsible for the cross-linking. If the complexes are heated without alcohols, anhydride is formed showing a peak at 1780 $cm^{-1}$. The peak at 1780 $cm^{-1}$ disappeared when heated with alcohol. This proves that esters are formed instead of anhydride.

Typical example: Weigh 10 g PAA-PANI complexes (MW. of PAA is 450,000). The ratio of PAA to aniline is 1:0.8. The solid content is 1.6%. 1 g 5% polyvinyl alcohol is added to PAA-PANI complexes. The solution is cast on glass and dried in air at room temperature. The resulting films are cross-linked at 140–150° C. The conductivity of cross-linked films is $10^{-4}$ S/cm. It resists swelling in water.

EXAMPLE 4

Synthesis of Polymeric Complex of Poly(Vinyl Methyl Ether/Maleic Acid):(PVMEMA and Polyaniline (PANI)

Poly(vinyl methyl ether/maleic anhydride) is an alternate copolymer of vinyl methyl ether and maleic anhydride. First, it is hydrolyzed to poly(vinyl methyl ether/maleic acid). 0.7 g Poly(vinyl methyl ether/maleic anhydride) is added into 50 ml water. The mixture was stirred for 1 hour at 50–60° C. A viscous solution of poly(vinyl methyl ether/maleic acid) is obtained. 1.8 g aniline is added into the resulting solution of poly(vinyl methyl ether/maleic acid). The solution becomes more viscous. 30 ml acetic acid is added. The solution is stirred for 5 hours.

Adjust pH value of the solution to 0–1 by adding 85% $H_3PO_4$. Lower the temperature of the solution to −15° C. 4.6 g $Na_2S_2O_8$ dissolved in 20 water is dropped into the solution slowly. Keep stirring the mixture for 2 hours at −15° C. A green colloidal product was obtained.

The product is dialyzed in 0.1 M $H_3PO_4$ for 3 days, in water for 4 days and in two portion of 100 ml isopropyl alcohol for 1 day. PVMEMA-PANI complex dispersed in isopropyl alcohol is obtained.

Other functionalized conducting polymers were also used, including PAN:PAA and PAN:PBMA.

Results and Discussion

Synthesis

Commercially available poly(butadiene-co-maleic acid) is a 40% aqueous solution. It can be dissolved in acetic acid solution (>30%) or water with pH value higher than 7. When it is diluted with distilled water, it precipitates, because the dilution lowers its pH value. At low pH, there is strong inter-chain interaction between carboxylate groups. It reacts with aniline to form a gel. This suggests that PBMA and anilinium ions form a cross-linked network. The gel can also be dissolved in acetic acid solution (30%). Acetic acid can break the inter-chain interaction, because its carboxylate groups compete with other carboxylate groups on the polymer chains. It also lowers that freezing point of water, so that we can run the reaction at 3° C. The solution must be stirred for at least 2 hours or it will give a precipitated product. The reason for this is not clear. Probably, aniline associates with PBMA to form adducts or micelles, which prevent the resulting polyaniline from aggregation.

No evidence was found that there is any strong interaction between PBMA and pyrrole. Pyrrole is a much weaker base than aniline. Only highly concentrated strong acid can protonate pyrrole. Whether the solution is stirred for 1 hour or more than 5 hours, the resulting complexes seems to be of no difference. Pyrrole may not associate PBMA. However, there is some association between PPy and PBMA, which keeps PPy in solution.

The colloidal complexes are formed near 1:1 ratio of carboxylate group to monomer. Lower monomer loading is possible but higher loading leads to precipitate. This indicates that the mechanism of the complex formation may be template-guided synthesis like other complexes of conductive polymers such as PAA-PANI and PSA-PANJ. PBMA works as a template. The carboxylate groups on template chain associate with polyaniline or polypyrrole.

Sodium persulfate is a very strong oxidant, but it selectively oxidizes aniline and pyrrole, because aniline and pyrrole can loss electron much easier than PBMA. Low temperature may enhance the selectivity. That is why high conductivity and high quality films were obtained by lowering the temperature.

Characterization

FT-IR spectra of the complexes show the combination of absorption from both conductive polymers and PBMA (as shown in Table 1). Though some peaks are difficult to tell their origin, characteristic peaks of PANI and PPY can be identified. The absorption around 970 cm$^1$ and 1650 cm in complexes, which comes from CH out of plane deformation vibration and C=C double bond stretching vibration of trans-vinyl segment, indicates that double bout still exist in the complexes.

TABLE 1

| Infrared Absorption Bands | PAN: PMBA | PPY: PBMA |
|---|---|---|
| Conductive Polymers | 1557 cm$^{-1}$ | 1544 |
| | 1471 | 1164 |
| | 1298 | 891 |
| | 798 | 785 |
| | | 680 |
| PMBA | 2925 nCH | 2924 nCH |
| | 1702 nC = O | 1708 nC = O |
| | 1650 nC = C | 1650 nC = C |
| | 1401 | 1400 |
| | 971 | 963 |

Uv-Vis. Spectra of complexes is similar to those of single strand PAM and PPY. Both complexes have two broad absorption bands at 300-SOOnm and 600 nm-near JR. The peaks of PANJ are located at 400 nm and 800 nm. PPY complex has absorption throughout the UV-Vis. region. It shows absorption peaks at 460 nm, and a very broad peak from 800 to 1100 nm.

There is no significant difference between the IR and UV-Vis. spectra of complexes synthesized at different temperature.

Cross-link

The attempts to cross-link the complexes by free radical initiator failed because PAN and PPy are very good antioxidants. It is the conductive polymers that were oxidized, not the template. Conductive polymers can quench free radical reaction. Therefore it is impossible to cross-link the complexes by free radical. Cross-link was achieved by a simpler way-treating the films at 140° C. for 1 hour. The reaction that leads to cross-link is the esterification of the double bonds at high temperature by carboxlyate groups in the presence of acids that exists in the conductive polymers. The mechanism of cross-link is shown as follows:

of carboxylate groups, which are hydrophilic, are converted into ester, which is hydrophobic. In addition, the cross-linked network hinders the absorption of water. The cross-linked complexes hardly absorb water and do not crack. Though they are still brittle, they are stronger than free standing films of the polymeric complexes produced by the prior art.

Cross-linked Conducting Polymer as Conductive Films

Material synthesized according to Example 1 was used to form free standing films or as coatings on glass slides. The electrical conductivity of the films were examined.

Conductivity of the freestanding films depends on the temperature of the synthesis, and the temperature and time of the thermal treatment. (Table 2) The complexes synthesized at lower temperature have higher conductivity than those obtained at room temperature. The reason is that the lower temperature increases the selectivity of the oxidation, and reduces side reactions.

After cross-link at 140° C. for 1 hour, the conductivity increases a little. This may result from the shrink of the films.

TABLE 2

| | Electrical Conductivity (S cm$^{-1}$) | | | | | |
|---|---|---|---|---|---|---|
| Synthesis Temperature | 25 C. | | 0 C. | | −13 C. | |
| Conductive First Strand of the Polymeric Complex | PAN | PPy | PAN | PPy | PAN | PPy |
| Non | 0.09 | 0.08 | | 0.63 | 0.62 | |
| 140 C., 1 hr | 0.14 | | | 0.85 | 1.1 | |
| 180° C., 1 hr. | 0.18 | | | | | |

Conductivity of freestanding cross-linked film was measured by four-probe method. Freestanding films were prepared by peeling off cast films on glass. Conductivity of the freestanding film depends on the temperature of the synthesis. Conductivity of PPy and PANI complexes is very close. The complexes synthesized at lower temperature have higher conductivity than those obtained at room temperature. Complexes prepared at room temperature have conductivity about 10$^{-1}$ S/cm, while the conductivity of complexes produced at low temperature is about 10$^0$ S/cm. The reason is that the lower temperature increases the selectivity

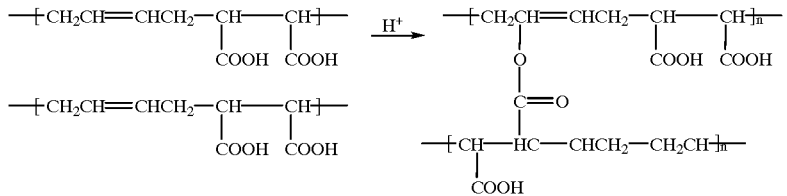

After thermal treatment at 140° C. for 1 hour, In IR spectra, the absorption of carbonyl group shifts from 1708 to 1774 cm$^{-1}$. This proves our prediction that ester forms after the treatment, since the absorption of esters usually appears at higher wavenumber than acids. The intensity of UV-Vis. absorption at long wavelength (600–1100 nm) becomes relatively lower after the heat treatment. Before thermal treatment, the complexes are hydrophilic. The films can absorb water and swell. They gradually break into pieces in water. When the films dry, they are brittle and tend to crack.

Figure 2A:
FIGS. 2a–2d are SEM morphologies of conductive polymer films.
Figure 2B:
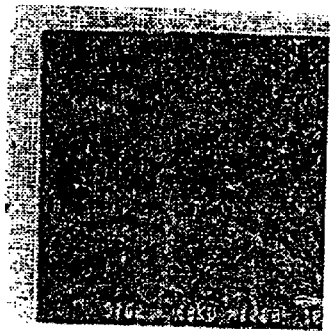
Figure 2C:
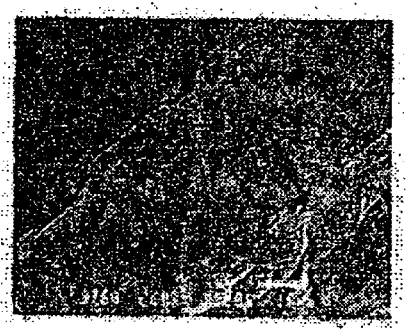
Figure 2D:
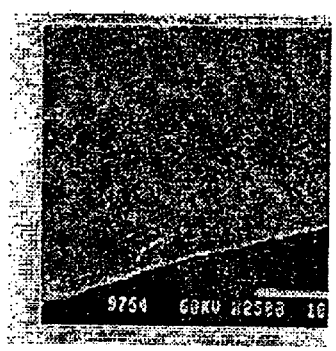

The thermal treatment should he carried out before the films are totally dry. After the thermal treatment, the complexes do not swell in water. The reason for this is that part of the oxidation, and reduces side reactions. After cross-link at 140° C. for 1 hour, the conductivity increases by a moderate amount. This results from the shrink of the films. When treated for longer time (3 hours) or at higher temperature (180° C.), the conductivity drops by one order of magnitude. FIG. 2a depicts SEM morphology of a cross-section of PANI-PBMA, top: non-cross-linked, bottom: cross-linked at 140° C. FIG. 2b depicts SEM morphology of a cross-section of PPy-PBMA, top: non-cross-linked, bottom: cross-linked at 140° C.

Electrochemical Responses

Cyclic voltammogram was measured in 0.5M NaCl at 1.0.1M HCl was used to maintain the pH value of the electrolyte to be 1. The cell was setup with conducting polymer coated on tin oxide as working electrode, Ag/AgCl electrode as reference, and a platinum counter electrode. The coatings were applied by spin coating solution of the polymeric complexes on tin oxide and the cross-linking them at 140° C. for 1 hour. In comparison, PANI-HCl and PPy-HCl deposited on ITO by electrochemical polymerization are also scanned. All samples were cycled three times between −600 mV and 750 mV. The scan rate is at rate 2 mV/sec.

FIG. 1a depicts a cyclic voltammogram of conducting polymer s on ITO in 0.5M NaCl at pH=1, (a) PANI-PBMA, (b) PPy-PBMA, (c) PANI-HCl and (d) PPy-HCl). Cyclic voltammogram of PANI-PBMA and PPy-PBMA on fluoride doped tin oxide (surface resistivity 80 ohm/)□ at pH 1 is similar to that of PANI-HCl and PPy-HCl prepared by electrochemical deposition (FIG. 1). All cyclic voltamograms exhibit two oxidation and two reduction peaks. The potential of these peaks are measured and listed in table 3. This indicates that two-step redox process is involved. The three cycles, especially the last two cycles were repeatable.

TABLE 3

Cyclic votammogram of conducting polymer coatings on ITO

| | Reduction peaks mV | | Oxidation peaks mV | |
|---|---|---|---|---|
| PANI-PBMA | −250 | 400–500 | 350 | >700 |
| PANI-HCl | −150 | 500 | 350 | >700 |
| PPy-PBMA | −300—350 | none | 200 | >700 |
| PPy-HCl | −250—300 | 450–550 | 200–300 | >700 |

Use Cross-Linkable Complex of Conducting Polymers as a Primer for Metals: Poly(butadiene/maleic acid) Polyaniline Complexes (PBMA—PANI) in Anticorrosion Application The polymeric complex of polyaniline and poly (butadiene-co-maleic acid), PAN:PBMA, was synthesized in the presence of $H_3PO_4$ by a method similar to example 1 except that the acid used in this synthesis was phosphoric acid instead of the sulfuric acid or the acetic acid. After purification by dialyzing in dilute phosphoric acid and then dialyzing in distilled water, it is dialyzed against THF to replace water in the solution by THF.

Metal coupons (aluminum alloys AA2024, AA7075 and cold rolled steel C1010) were mechanically polished with sandpaper to remove oxides. Aluminum alloys were used without surface pretreatment. The surface of steel test coupons were treated with acidic zinc phosphate solution before coating. The metal coupons were dipped twice in PAN-:PBMA dispersed in THF. It forms a coating on the surface of aluminum or steel. After the solvent is evaporated in air, the coated samples were heated at 140° C. for 1 hour. According to the infrared spectroscopic study of example 1, the polymeric complexes of polyaniline are cross-linked due to the reaction between the carboxylic pendent group and the double bonds on the backbone of PBMA. A smooth and strongly adherent green coating was formed on the surface of the metal samples. The thickness of the film is about 0.2 mil.

Two-Layer Coating on Metals. Sea Water Immersion Tests

These samples were obtained by depositing a thin layer of epoxy on top of samples prepared in the section entitled "Cross-Linked Conducting Polymer as Conductive Films". A thin layer of commercial water-borne epoxy resin (PPG Industries) without curing agent was electrophoretically deposited on top of the PAN:PBMA coating. The sample is then heated at 140° C. for 30 mm. The thickness of the hardened epoxy top layer is estimated to be about 0.4 mil.

The coating is scratched with a knife to expose X-shaped lines of metal surface. Samples were immersed in sea water (from the Narragansett Bay, R.I.) for 40 days. Although the exposed metal surface at the scratched lines were oxidized. There was no undercut or blister found on the coated surface.

Cross-linked PAN:PBMA as an Electrochromic Film

PAN:PBMA complexes synthesized according to example 1 were used as a coating on conductive and transparent glass. The electrochromic properties of the film were tested by cyclic voltametry.

Thin layer of PAN:PBMA (0.05 mil) was coated on conductive tin oxide glass (100 ohm per square) by spin coating a THF solution of the polymeric complex. The cross-linking reaction was initiated by heating at 140 C. for 1 flour. A transparent-green film was evenly coated on the tinoxide glass. The adhesion and the film integrity are maintained when the film was immersed in aqueous solution. Without the heat induced cross-linking, the film swells and breaks into small fragments that detaches from the surface of the tin oxide glass when immersed in the same aqueous solution. This indicated again that the advantage of the functionalized polymeric complex.

Cyclic voltamogram scanned at 1 mV per second shows the characteristic cyclic voltamogram similar to that of the electrochemically deposited single-strand polyaniline. This indicates that ohmic contact between the tin oxide and the cross-linked polymeric complex. During the cyclic voltametric scan, the entire film switches color from clear to green then to blue as the electrochemical potential was scanned from −0.2 V to 0.8 V vs Standard Calomel Electrode. The color switching was reversed when the potential sweep was reversed. This indicates that the cross-linked electrochromic film can be used for easy and reliable fabrication of electrochromic windows and electrochromic display devices.

Metal Surface Treatment by Phospate Solution Containing Functionalized Conducting Polymer Phosphoric acid or zinc phosphate treatment of metal surface is a classic method for promoting primer-to-surface adhesion. This example shows that the functionalized conducting polymers can be used as an additive to the traditional phosphate surface treatment. One method of phosphating involves the addition of poly(vinylbutyral) to the phosphating solution, which is sometimes referred to as a "wash primer". In this example, functionalized conducting polymer are used as an additive to the phosphate/poly(vinylbutyral) formulation.

Corrosion Tests of the Conducting Polymer Modified Phosphating Reagent 1 g 85% $H_3PO_4$ and 3 g poly(vinyl alcohol/vinyl butyral) (20% vinyl alcohol) are dissolved in SOml isopropyl alcohol. The solution of poly(vinyl alcohol/vinyl butyral) is blended with PVEMA-PAM complex in isopropyl alcohol.

Steel is treated by sand paper to remove oxides and then phosphated in solution of phosphoric acid and zinc phosphate. It is dipped in the mixture of poly(vinyl alcohol/vinyl butyral) and PVMEMA-PAM twice. It forms a coating on the surface of steel. Dry it and then heat it at 140° C. for 1 hours, deposit a layer of epoxy on its top and then cure epoxy at 140° C. for 30 mm.

Steel is tested in sea water for 40 days. Corrosion occurs only at the scratched lines where metal was exposed. There was no sign of damage for the formulation that contains PAN:PAA or PAN:PBMA as an additive to the phosphating solution. The film integrity of the PAN:PVMEMA is not as good but there was no significant corrosion.

It was known that the phosphate deposited on the metal surface binds and physically cross-link poly(vinylbutyral) in the traditional wash primer. It is likely that the phosphate binds the carboxylic functional groups of the second strand of the complexes of conducting polymer and promotes adhesion and corrosion inhibition at the metal surface.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. An electrically conductive composition which comprises:
   a plurality of cross-linked polymeric complexes; each polymeric complex comprising:
   a strand of a π-conjugated polymer; and
   a strand of a polyelectrolyte, the polyelectrolyte being non-covalently bonded to the it-conjugated polymer and having at least one reactive functional group, the reactive functional group facilitating the cross-linkage between the polymeric complexes when the complexes are heated, the composition resisting swelling when exposed to an aqueous medium.

2. The composition of claim 1 wherein the it-conjugated polymer is selected from the group consisting of polyaniline, polypyrrole, polyacetylene and polythiophene.

3. The composition of claim 2 wherein the polyelectrolyte is selected from the group consisting of poly(butadiene-co-maleic acid), poly(vinylmethylether-co-maleic acid), poly(acrylic acid), poly(ethylmethacrylate-co-acrylic acid) and poly(acrylamide-co-acrylic acid).

4. The composition of 3 wherein the polyelectrolyte has a backbone and the functional group comprises:
   at least one unsaturated double bond in the polymer backbone of the polyelectrolyte.

5. The composition of claim 4 wherein the functional group comprises at least one pendent group selected from the group consisting of carboxylic acid groups, hydroxy groups, amine groups, amide groups, nitrile groups, aldehyde groups and ketone groups.

6. The composition of claim 5 wherein there are at least two functional groups and each functional group reacts with each other or optionally with each other and a functional group from other polymeric complexes or optionally with each other and with the functional groups of other polymeric complexes.

7. The composition of claim 6 wherein the polymeric complexes are water-borne or optionally are dispersible in organic solvents.

* * * * *